United States Patent [19]

Muromura

[11] 4,075,306

[45] Feb. 21, 1978

[54] METHOD FOR DRYING AN AMMONIA GAS STREAM

[75] Inventor: Tadasumi Muromura, Tokai, Japan

[73] Assignee: Japan Atomic Energy Research Institute, Tokyo, Japan

[21] Appl. No.: 733,903

[22] Filed: Oct. 19, 1976

[30] Foreign Application Priority Data

Dec. 26, 1975   Japan ................................. 51-156280

[51] Int. Cl.$^2$ .............................................. C01C 1/00
[52] U.S. Cl. ................................. 423/352; 423/210; 423/219; 55/29
[58] Field of Search ................ 423/352, 210, 359, 219; 55/29, 30

[56] References Cited

U.S. PATENT DOCUMENTS

| 477,089 | 6/1892 | Strombeck | 423/352 |
|---|---|---|---|
| 1,654,863 | 1/1928 | Cooper et al. | 423/352 |
| 3,349,569 | 10/1967 | Nebgen | 55/29 X |

OTHER PUBLICATIONS

Audrieth "Inorganic Synthesis", McGraw-Hill Book Company, 1950, pp. 48–50.

*Primary Examiner*—Edward J. Meros
*Attorney, Agent, or Firm*—Browdy and Neimark

[57] ABSTRACT

An ammonia stream can be dried by passing the ammonia stream through liquified ammonia in which sodium metal is dissolved and which is maintained at the boiling point.

5 Claims, 1 Drawing Figure

METHOD FOR DRYING AN AMMONIA GAS STREAM

BACKGROUND OF THE INVENTION

1. Field of the Invention

This invention relates to a method for highly drying an ammonia stream, more particularly, it relates to a method for drying an ammonia stream characterized by passing the ammonia stream through liquified ammonia in which sodium metal is dissolved and which is maintained at the boiling point.

2. Description of the Prior Art

There are two typical conventional methods for drying an ammonia gas.

One is the method in which an alkaline drying agent is employed. Whereas this conventional method has the advantage that a larger quantity of ammonia can be continuously dried, it has the defect that approximately 4 ppm of moisture can not be removed from the ammonia gas, even if the strongest drying agent, CaO, is employed under the most effective conditions.

The other typical one is characterized by liquifying the ammonia gas to form a liquid ammonia and dissolving sodium metal therein to remove the moisture. When this conventional method is actually carried out, the liquified ammonia is heated to evaporate. This conventional type of method has been known as the most effective drying method. However, this conventional method has been used only on a laboratory scale, because it can not be carried out except inside a sealed glass container.

As explained above, the conventional methods for drying an ammonia stream suffer from defects, and therefore, there has long been a great need for improving the conventional methods, thereby developing a new method for ensuring effective and efficient removal of the moisture from the ammonia stream.

SUMMARY OF THE INVENTION

Therefore, the main object of this invention is to provide a novel method for drying an ammonia stream.

Another object of this invention is to provide a novel method for drying highly and efficiently a large quantity of ammonia stream.

A further object of this invention is to provide a method for drying highly and efficiently an ammonia stream characterized by passing the ammonia stream through liquified ammonia in which a sodium metal is dissolved and which is maintained at the boiling point.

Other objects and advantages of this invention will be developed apparent in the following pages:

DETAILED EXPLANATION OF THE INVENTION

Figure 1:
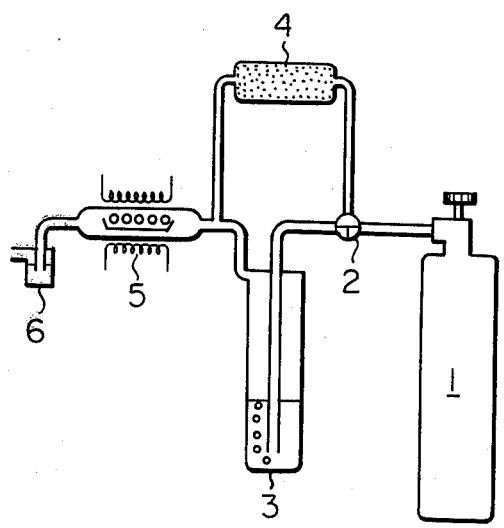
FIG. 1 is a schematic illustration of an embodiment of the apparatus used for comparative experiment between the method of this invention and conventional method.

This invention relates to a method for drying an ammonia stream; more particularly, it relates to a method for drying an ammonia stream characterized by passing the ammonia stream through liquified ammonia in which a sodium metal is dissolved and which is maintained at the boiling point.

Usually, a slight amount of moisture is contained in an ammonia gas, and this sometimes causes the modification or oxidation of the reactants or the products. Therefore, several methods for drying an ammonia gas have been conventionally exployed. However, the conventional methods have disadvantages as explained previously. Accordingly, there has long been a great need for improving the conventional methods.

The method for drying an ammonia stream of this invention is characterized by passing the ammonia stream through liquified ammonia in which sodium metal is dissolved and which is maintained at the boiling point.

In accordance with this invention, the liquified ammonia is maintained at the boiling point under the ammonia stream, and therefore, change in weight of the liquified ammonia does not occur.

The example of this invention will hereunder be explained compared with the conventional method using CaO as a drying agent, but it should be understood by those skilled in the art that this invention is by no means limited by this example.

EXAMPLE

Ammonia used in this example is contained in a bomb and contains about 80 ppm of moisture. About 4.0 gram of uranium mononitride (UN) was used as an agent for determining the moisture. The uranium mononitride reacts easily with the moisture at 1400°-1500° C to convert to uranium dioxide. The moisture was determined from the change in the weight between the uranium mononitride and the uranium dioxide. In this example, the pressure of the ammonia stream was maintained at atmospheric pressure, and therefore, the boiling point of the liquified ammonia is −33° C.

FIG. 1 shows a schematic illustration of an embodiment of the apparatus employed in this example. In FIG. 1, 1 is ammonia bomb, from which the ammonia gas containing about 80 ppm of moisture is supplied to the system. 2 is a stopcock for shifting the ammonia stream. The ammonia stream is introduced to the means for determining the moisture 5 via the stream 2 - 3 involving the dryer of this invention or via the stream 2 - 4 involving the dryer conventionally used. 3 is a glass tubular drying means used in accordance with this invention. And said drying means 3 contains about 40 ml.(cc) of liquified ammonia in which about 300 mg of sodium metal is dissolved. The temperature of the liquified ammonia was maintained at around −33° C by cooling externally by solid carbondioxide. 4 is a conventional drying means using CaO. 5 is a means for determining the moisture. About 4g of uranium mononitride was used as an agent for determining the moisture. 6 is a means for prevention of the reverse flow of gas. The ammonia stream was charged into the system at the rate of 1l/min., and the change in the weight of uranium mononitride with time was measured. Consequently, the gain in weight after six hours (300l of the ammonia stream had passed) was about 2.6 mg in accordance with the conventional drying method using CaO; which fact demonstrates that about 16 ppm of moisture exist in the ammonia gas. On the other hand, in accordance with the drying method of this invention, no change in weight was observed even with the measurement precision of ±0.1 mg.; which fact shows that the moisture content of ammonia was less than 0.6 ppm.

This example clearly shows that the drying method of this invention is significantly superior to the conventional method using CaO.

This example was carried out when the pressure of the ammonia stream is 1 atm., but it should well be understood by those skilled in the art that the drying method of this invention is also available in a pressure-temperature range where two phases of the liquified ammonia and ammonia gas coexist at equilibrium.

Further, the drying method of this invention will be made more effectively by predrying the ammonia stream with drying agents such as KOH, CaO, etc. And even oxygen, per se, in the ammonia stream can be removed as moisture in accordance with this invention by pretreating the ammonia stream with a palladium catalyst.

I claim:

1. A method for drying an ammonia gas stream which comprises passing the ammonia gas stream through a liquified ammonia maintained at the boiling point and in which sodium metal is dissolved.

2. A method of claim 1 wherein said method is carried out in a pressure-temperature range where two phases of the liquified ammonia and ammonia gas coexist at equilibrium.

3. A method of claim 1 further including the step of predrying by means of drying agents.

4. A method of claim 3 wherein said drying agent is selected from the group consisting of potassium hydroxide and calcium oxide.

5. A method for removing oxygen from an ammonia gas stream comprising:
    pretreating the ammonia gas stream with a palladium catalyst to convert the oxygen to moisture; and
    passing the pretreated ammonia gas stream through a liquefied ammonia maintained at the boiling point and in which sodium metal is dissolved to remove the moisture from the stream.

* * * * *